US012662146B2

(12) United States Patent (10) Patent No.: US 12,662,146 B2
Heckel et al. (45) Date of Patent: Jun. 23, 2026

(54) METHODS AND SYSTEMS FOR VEHICLE CONTROL WITH CUSTOMIZABLE COMMANDS

(71) Applicant: Toyota Motor North America, Inc., Plano, TX (US)

(72) Inventors: Robert Heckel, Katy, TX (US); Mark Anthony McClung, Celina, TX (US); Steven S. Basra, Frisco, TX (US); Charan S. Lota, Frisco, TX (US); Benjamin R. Resnick, Plano, TX (US); Ryan Wheeler, Denton, TX (US); Lokesh Kumar Viswavarapu, Frisco, TX (US); Raja Shekar Kilaru, Addison, TX (US); Nikhil Rajendra, Plano, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 7 days.

(21) Appl. No.: 18/776,660

(22) Filed: Jul. 18, 2024

(65) Prior Publication Data

US 2026/0021821 A1 Jan. 22, 2026

(51) Int. Cl.
*B60W 50/10* (2012.01)
(52) U.S. Cl.
CPC ..... *B60W 50/10* (2013.01); *B60W 2510/1005* (2013.01); *B60W 2510/18* (2013.01);
(Continued)
(58) Field of Classification Search
None
See application file for complete search history.

(56) References Cited

U.S. PATENT DOCUMENTS 10,504,514 B2 * 12/2019 Panainte ................. G06F 3/167
10,950,229 B2 3/2021 Biswal et al.
(Continued)

FOREIGN PATENT DOCUMENTS

CN 111883118 A 3/2020
DE 102013007256 A1 10/2014
(Continued)

OTHER PUBLICATIONS

Rohit Mahajan, "How AI is revolutionizing the car "infotainment" industry", pp. 1-5, Jun. 13, 2023; www.linkedin.com/pulse/how-ai-revolutionizing-car-infotainment-industry-rohit-mahajan.

*Primary Examiner* — Jonathan M Dager
(74) *Attorney, Agent, or Firm* — Dinsmore & Shohl LLP

(57) ABSTRACT

Disclosed systems and methods for customizable commands for vehicle operation include one or more command sensors configured to receive a command from a user, one or more environmental sensors configured to collect environmental information, and one or more processors. The one or more processors are operable to cause the systems to determine, based on a command database and user command profiles, whether the received command includes a high-level function of vehicle operation, in response to determining that the received command includes the high-level function, generate sequential vehicle operations based on the high-level function and the environmental information, the sequential vehicle operations including one or more fundamental functions of vehicle operation, and operate a vehicle using the sequential vehicle operations.

18 Claims, 5 Drawing Sheets

(52) U.S. Cl.
CPC ... *B60W 2510/20* (2013.01); *B60W 2520/105* (2013.01); *B60W 2554/00* (2020.02); *B60W 2555/20* (2020.02)

(56) References Cited

U.S. PATENT DOCUMENTS

| | | | | |
|---|---|---|---|---|
| 11,037,556 B2* | 6/2021 | Rangarajan | ............ | B60K 35/10 |
| 11,257,502 B2 | 2/2022 | Himmelstein | | |
| 11,572,052 B2* | 2/2023 | Yashiro | ................. | B60W 40/06 |
| 11,753,013 B2* | 9/2023 | Reckziegel | .......... | B60W 30/16 |
| | | | | 701/27 |
| 11,987,239 B2* | 5/2024 | Yamaoka | .............. | B60W 50/14 |
| 12,304,487 B2* | 5/2025 | Ozay | ................. | B60W 30/0956 |
| 2007/0288242 A1* | 12/2007 | Spengler | ................. | G10L 15/20 |
| | | | | 704/E15.04 |
| 2015/0057931 A1* | 2/2015 | Pivonka | ............ | G01C 21/3484 |
| | | | | 701/533 |
| 2017/0080952 A1* | 3/2017 | Gupta | .................. | B60W 50/14 |
| 2018/0208195 A1* | 7/2018 | Hutcheson | ........... | B60W 50/14 |
| 2019/0054922 A1* | 2/2019 | Yalla | ..................... | B60W 10/20 |
| 2019/0094868 A1* | 3/2019 | Zych | .................... | G05D 1/0077 |
| 2019/0147855 A1* | 5/2019 | Zhao | ....................... | G10L 15/01 |
| | | | | 704/232 |
| 2019/0387060 A1* | 12/2019 | Kentley-Klay | ........ | G05D 1/024 |
| 2020/0216086 A1* | 7/2020 | Lenke | ................... | B60W 50/08 |
| 2020/0233414 A1* | 7/2020 | Akella | .................. | B60W 30/16 |
| 2020/0342760 A1* | 10/2020 | Vassilovski | ..... | B60W 30/18159 |
| 2021/0016732 A1 | 1/2021 | Rajan et al. | | |
| 2021/0105619 A1* | 4/2021 | Kashani | .................. | G10L 15/25 |
| 2021/0129852 A1* | 5/2021 | Bielby | .................. | G06N 20/00 |
| 2022/0203996 A1* | 6/2022 | Katz | ..................... | B60W 50/14 |
| 2022/0230636 A1* | 7/2022 | Wang | ..................... | G10L 15/22 |
| 2022/0329990 A1* | 10/2022 | Priziment | ........ | G08G 1/096741 |
| 2024/0362931 A1* | 10/2024 | Katz | ..................... | G06V 40/20 |
| 2025/0029206 A1* | 1/2025 | Ranzinger | ............. | G06V 10/82 |
| 2025/0091603 A1* | 3/2025 | Jafari | .................. | B60W 60/001 |
| 2025/0091617 A1* | 3/2025 | Esna Ashari Esfahani | ................. | |
| | | | | B60W 60/0016 |

FOREIGN PATENT DOCUMENTS

| | | |
|---|---|---|
| DE | 102014008203 A1 | 3/2015 |
| EP | 2200021 A1 | 6/2010 |
| WO | 2021211150 A1 | 10/2021 |

* cited by examiner

500

DETERMINING WHETHER RECEIVED
COMMAND COMPRISES A HIGH-LEVEL
FUNCTION OF VEHICLE OPERATION
— 501

GENERATING SEQUENTIAL VEHICLE
OPERATIONS BASED ON THE HIGH-LEVEL
FUNCTION AND THE ENVIRONMENT INFORMATION
— 502

OPERATING A VEHICLE USING THE
SEQUENTIAL VEHICLE OPERATIONS
— 503

METHODS AND SYSTEMS FOR VEHICLE CONTROL WITH CUSTOMIZABLE COMMANDS

TECHNICAL FIELD

The present disclosure relates to vehicle control technologies, and more particularly, to vehicle control technologies based on natural language processing.

BACKGROUND

Voice control car systems having car voice assistance often restrict user interaction to predetermined commands and sequences. With the growing recognition of the constraints associated with this rigid approach, users increasingly desire more intuitive and personalized interactions with their vehicles, encompassing a broader range of commands and tailored responses. Accordingly, there is a need for adaptable and personalized command systems capable of understanding and accommodating the unique needs and preferences of each user, especially for high-level functions, thereby enhancing user experience.

SUMMARY

In a first aspect, a system for customizable commands for vehicle operation includes one or more command sensors configured to receive a command from a user, one or more environmental sensors configured to collect environmental information, and one or more processors. The one or more processors are operable to cause the systems to determine, based on a command database and user command profiles, whether the received command includes a high-level function of vehicle operation, in response to determining that the received command includes the high-level function, generate sequential vehicle operations based on the high-level function and the environmental information, the sequential vehicle operations including one or more fundamental functions of vehicle operation, and operate a vehicle using the sequential vehicle operations.

In a second aspect, a method for customizable commands of vehicle operation includes determining, based on a command database and user command profiles, whether received command includes a high-level function of vehicle operation, in response to determining that the received command includes the high-level function, generating sequential vehicle operations based on the high-level function and environmental information generated by one or more environmental sensors, and operating a vehicle using the sequential vehicle operations. The sequential vehicle operations include one or more fundamental functions of vehicle operation.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
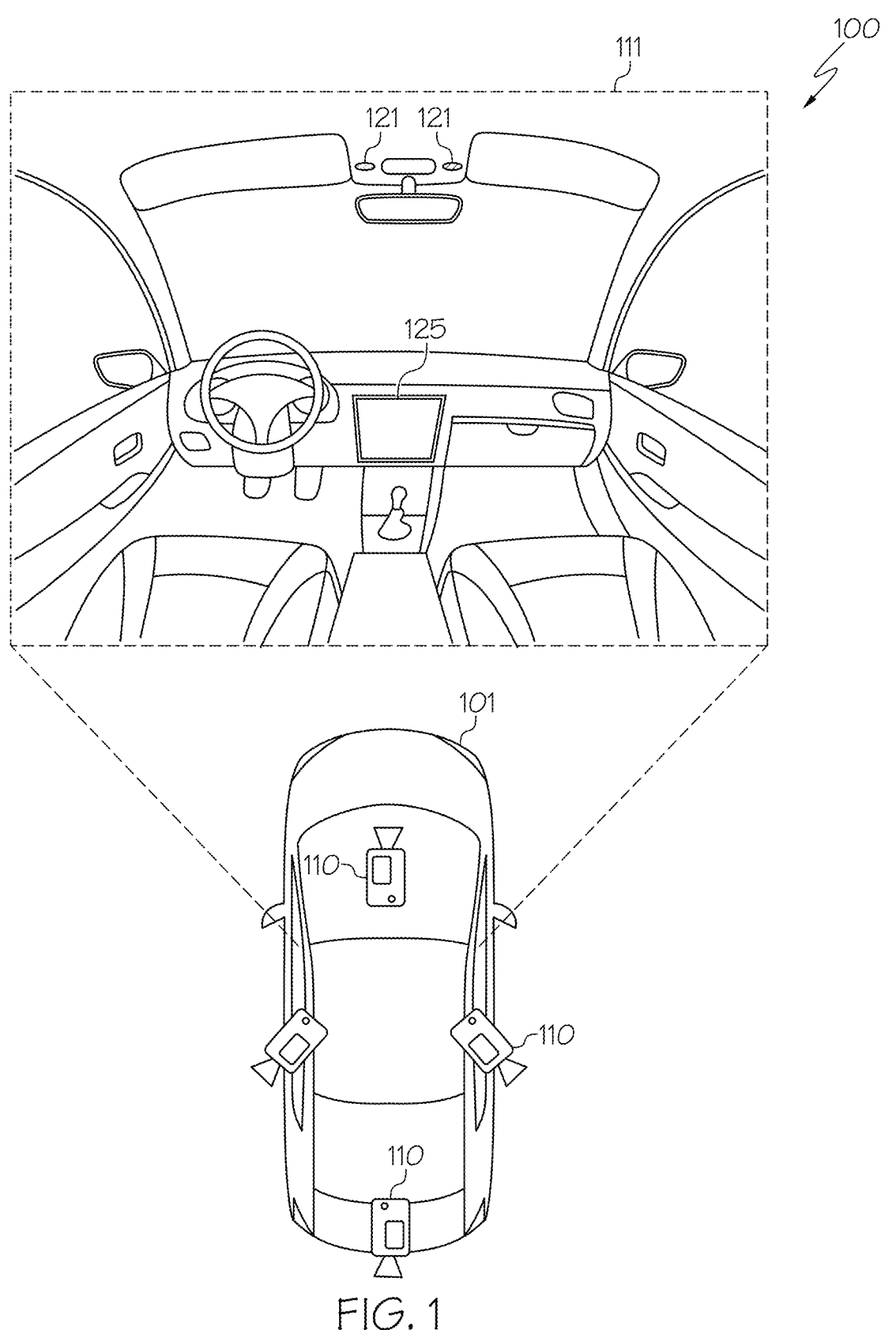
FIG. 1 schematically depicts an example customizable command system, according to one or more embodiments shown and described herein.

The embodiments described herein are directed to systems and methods of artificial intelligence (AI) based technologies to create personalized commands to control and perform functions of vehicles. The systems described herein may include one or more vehicle modules that receive human language commands from users. The system may understand the human language using natural language processing (NLP) functions and interpret the commands into one or more sequential vehicle operations including one or more high-level functions of vehicle operations. The sequential vehicle operations may be a series of operations based on one or more fundamental functions. The system may create and store the personalized commands associated with the high-level functions in user profiles. The one or more vehicle modules may include machine-learning functions, such as AI functions. Particularly, the one or more vehicle modules may include neural network models, such as generative AI models. The systems and methods described herein personalize the control of vehicle functions through personalized commands. By integrating NLP capabilities, users can communicate with the vehicle in a conversational manner without rigid commands, simplifying the interaction process, and translating the human language into high-level functions and sequential vehicle operations. Furthermore, the system may be refined to understand commands and preferences over time with, enhancing accuracy and effectiveness.

Particularly, the disclosed systems and methods include the capability to interpret high-level functions into a series of fundamental operations for sequential vehicle actions. By breaking down commands into smaller, manageable tasks, the system enhances efficiency and precision in executing user instructions. For instance, a command like "change to the left lane" or "park at a parking spot near the entrance of the building" might involve fundamental functions such as lane detection, signaling, steering adjustments, sensor integration, obstacle detection, and desirable maneuvering, respectively. Each of these fundamental functions may be arranged by the system to accomplish the overall task as understood from the command. The system's ability to interpret and execute sequential vehicle operations opens up possibilities for more sophisticated automation and autonomous driving capabilities. By integrating advanced sensors and AI algorithms, the system can anticipate and respond to changing road conditions, traffic patterns, and user inputs, enabling a smoother and more intelligent driving experience. As such, the disclosed approach allows users to define personalized commands that are tailored to their specific preferences and driving habits, which are then translated into a sequence of fundamental operations by the system.

Various embodiments of the methods and systems for customizable commands for vehicle operation are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Figure 2:
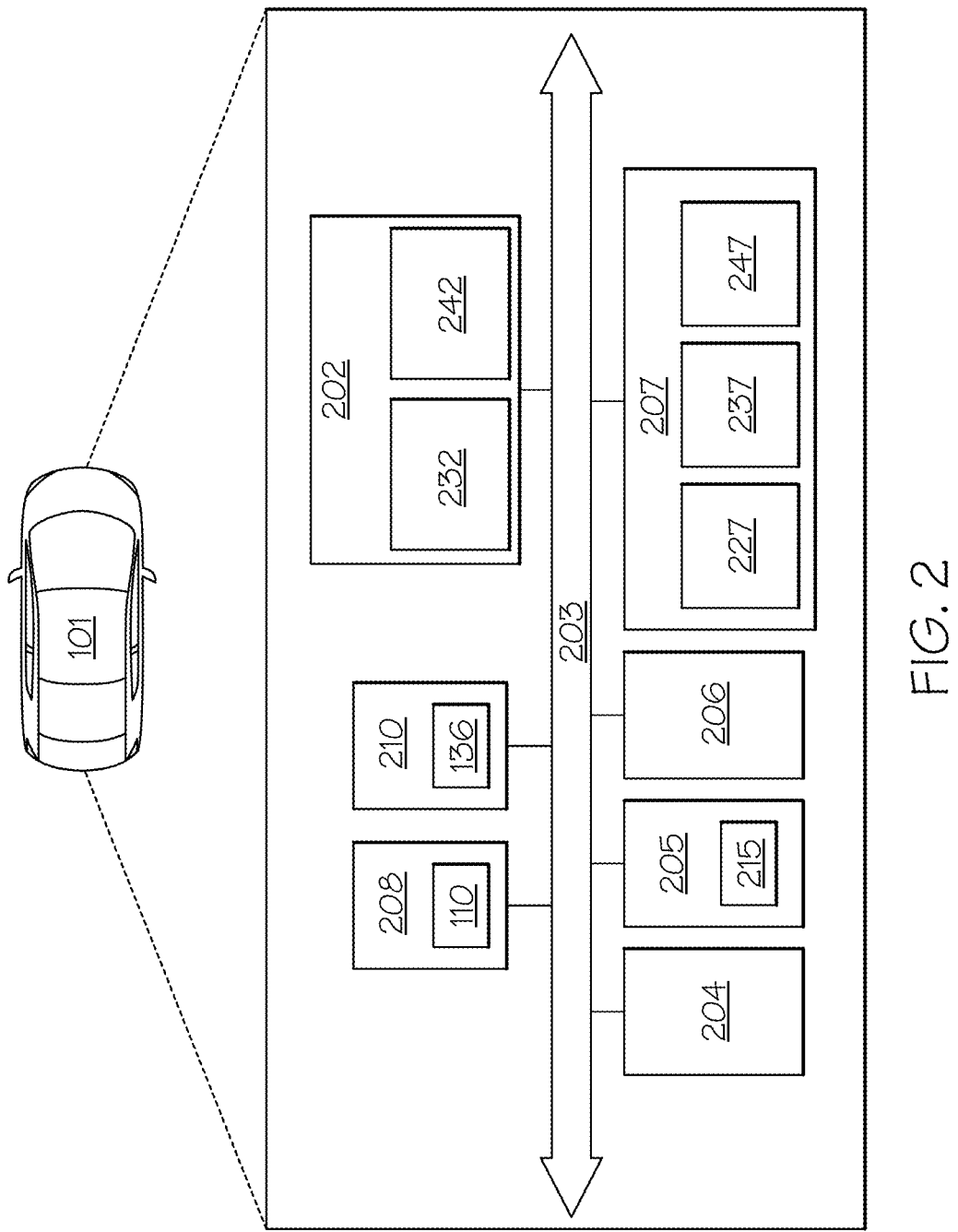
FIG. 2 schematically depicts non-limiting components of the devices on a vehicle for vehicle control with customizable commands, according to one or more embodiments shown and described herein.
Figure 3:
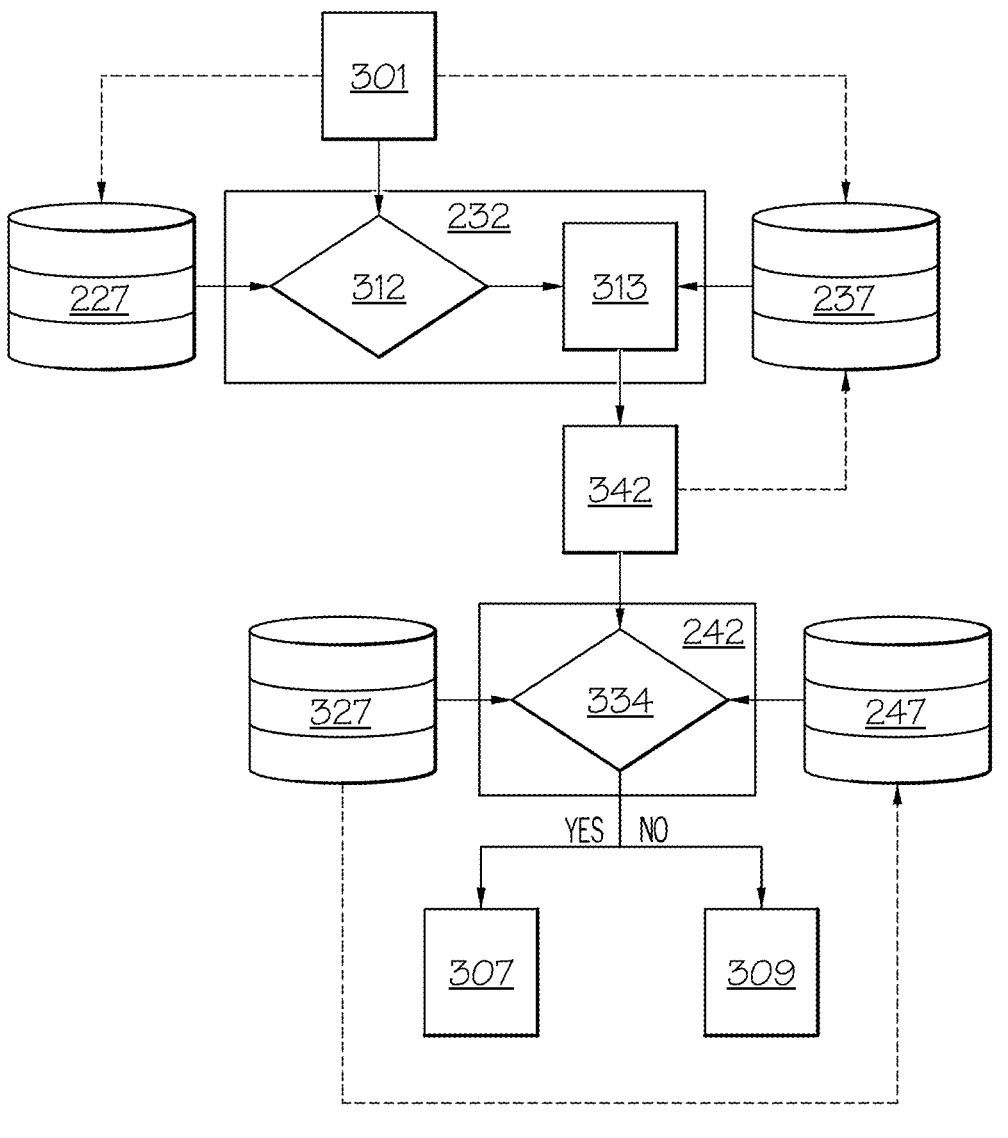
FIG. 3 schematically depicts an example block diagram of operating the example customizable command system with customizable commands, according to one or more embodiments shown and described herein.

Turning to figures, FIG. 1 generally depicts an example customizable command system 100 for vehicle control functions. The customizable command system 100 may include one or more environmental sensors 208 (e.g., as illustrated in FIG. 2), such as one or more cameras 110 (for example, a front camera, one or more side cameras, and a rear camera) attached to a vehicle 101 and configured to generate environmental information data 327 (e.g., as illustrated in FIG. 3) surrounding the vehicle 101 in real-time. The vehicle 101 may include one or more command sensors 215 (e.g., as illustrated in FIG. 2), such as one or more sound sensors 121 and a touchscreen 125, in the vehicle interior 111 of the vehicle 101. The one or more command sensors 215 may be configured to receive one or more commands from a user. The vehicle 101 may include one or more processors 204 (e.g., as illustrated in FIG. 2). The processors 204 may perform AI functions to generate sequential vehicle operations based on the received commands from the user and further operate the vehicle using the sequential vehicle operations to fulfill the user commands.

The vehicle 101 may be an automobile or any other passenger or non-passenger vehicle such as, for example, a terrestrial, aquatic, and/or airborne vehicle. The vehicle 101 may be an autonomous vehicle that navigates its environment with limited human input or without human input. The vehicle 101 may include actuators for driving the vehicle, such as a motor, an engine, or any other powertrain. The vehicle 101 may move or appear on various surfaces, such as, without limitation, roads, highways, streets, expressways, bridges, tunnels, parking lots, garages, off-road trails, railroads, or any surfaces where the vehicles may operate. The vehicle 101 may move forward or backward.

In embodiments, the environmental sensors 208 may include one or more light sensors, such as, without limitation, cameras 110, LIDAR sensors, radar sensors, one or more position sensors, one or more weather sensors, such as, without limitation, thermometers, barometers, hygrometers, anemometers, and ultrasonic sensors, pyranometers, and other sensors configured to collect data of information surrounding the vehicle 101. The environmental information data 327 may include environmental information, such as, without limitation, weather conditions, wind direction and speed, road conditions, traffic conditions, and obstacle information. For example, the cameras 110 may operably generate one or more images of the environment around the vehicle 101. The cameras 110 may be, without limitation, one or more monocular cameras, red-green-blue (RGB) cameras, or red-green-blue-depth (RGB-D) cameras. The images may be, without limitation, monocular images, RGB images, or RGB-D images. The cameras 110 may be mounted to the exterior of the vehicle 101 at the front of the vehicle 101, at the rear of the vehicle 101, on the side of the vehicle 101, on top of the vehicle 101, and/or at any other location on the vehicle 101. For example, the cameras 110 can be mounted to the rear of the vehicle 101 and/or one or more side view mirrors of the vehicle 101 and can have a field of view of various objects in the environment surrounding the vehicle 101.

In some embodiments, the one or more command sensors 215, such as the sound sensors 121 or the touchscreen 125, may be included in the vehicle 101 and/or other electronic devices. The electronic devices may be, without limitation, a computer, a laptop, a cell phone, a smartphone, a tablet, a wearable device such as a smartwatch or fitness tracker, a web-based messaging platform, or a voice assistance.

In embodiments, the user of the customizable command system 100 may be a natural person, an organization, an entity, an AI assistant, or an Internet of Things (IoT) device. The user may provide one or more commands, such as oral, written, or imagine commands, to the customizable command system 100. The user may provide a command in the form of, without limitation, a voice command, a text command, an image command, or a combination thereof. The one or more commands from the user may be, without limitation, a sound track, a plain text, a rich text, an emoji, an emoticon, a multimedia message (MMS), an animated image, a voice message, or an attached file.

Referring to FIG. 2, non-limiting components of devices on the vehicle 101 of the example customizable command system 100 are depicted. The vehicle 101 may comprise one or more modules, such as a command interpreter module 232 and an aggressive operation module 242. The vehicle 101 may comprise various components, such as a memory component 202, a processor 204, an input/output hardware 205, a network interface hardware 206, a data storage component 207, and a communication path 203.

The vehicle 101 may comprise a processor 204 and a memory component 202, such as a non-transitory computer-readable memory. The processor 204 may be any device capable of executing the machine-readable instruction set stored in the non-transitory computer-readable memory. Accordingly, the processor 204 may be an electric controller, an integrated circuit, a microchip, a computer, or any other computing device. The processor 204 may include any processing component(s) configured to receive and execute programming instructions (such as from the data storage component 207 and/or the memory component 202). The instructions may be in the form of a machine-readable instruction set stored in the data storage component 207 and/or the memory component 202. The processor 204 is communicatively coupled to the other components of the vehicle 101 by the communication path 203. Accordingly, the communication path 203 may communicatively couple any number of processors 204 with one another, and allow the components coupled to the communication path 203 to operate in a distributed computing environment. The communication path 203 may be implemented as a bus or other interface to facilitate communication among the components of the vehicle 101. In some embodiments, each of the components may operate as a node that may send and/or receive data. While the embodiment depicted in FIG. 2 includes a single processor, other embodiments may include more than one processor.

The memory component 202 (e.g., a non-transitory computer-readable memory component) may comprise RAM, ROM, flash memories, hard drives, or any non-transitory memory device capable of storing machine-readable instructions such that the machine-readable instructions can be accessed and executed by the processor 204. The machine-readable instruction set may comprise logic or algorithm(s)

written in any programming language of any generation (e.g., 1GL, 2GL, 3GL, 4GL, or 5GL) such as, for example, machine language that may be directly executed by the processor 204, or assembly language, object-oriented programming (OOP), scripting languages, microcode, etc., that may be compiled or assembled into machine readable instructions and stored in the memory component 202. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. For example, the memory component 202 may be a machine-readable memory (which may also be referred to as a non-transitory processor-readable memory or medium) that stores instructions that, when executed by the processor 204, causes the processor 204 to perform a method or control scheme as described herein. While the embodiment depicted in FIG. 2 includes a single non-transitory computer-readable memory, other embodiments may include more than one memory module.

The input/output hardware 205 may include a monitor, keyboard, mouse, printer, camera, microphone, speaker, and/or other device for receiving, sending, and/or presenting data. The network interface hardware 206 may include any wired or wireless networking hardware, such as a modem, LAN port, Wi-Fi card, WiMax card, mobile communications hardware, and/or other hardware for communicating with other networks and/or devices. The input/output hardware 205 may include one or more command sensors 215, such as, without limitation, one or more sound sensors 121, one or more touchscreens 125, or a combination thereof. In some embodiments, the command sensors 215 may be included in the vehicle 101 and/or other electronic devices, such as, without limitation, a computer, a laptop, a cell phone, a smartphone, a tablet, a wearable device such as a smartwatch or fitness tracker, a web-based messaging platform, or a voice assistance. The command sensors 215 may be coupled to the communication path 203 and communicatively coupled to the processor 204. The sound sensors 121 may be one or more sensors coupled to the customizable command system 100 for determining the volume, pitch, frequency, and/or features of sounds in the vehicle 101. Each sound sensor 121 may include a microphone or an array of microphones that may include mechanisms to filter background noise, such as engine sounds or beamforming. The one or more sound sensors 121 may be located in the vehicle interior 111 to detect and process the sound waves that are produced when a person speaks in the vehicle 101. The sound sensors 121 may be located in the ceiling, dashboard, or center console of the vehicle interior 111. The sound sensors 121 may be connected to one or more microphones picking up the soundwaves. The soundwaves are then processed by the one or more processors 204, which converts the soundwaves into digital signals.

The data storage component 207 can store command database and user command profile 227, sample sequential vehicle operations 237, and historical environmental information 247. The sample sequential vehicle operations 237 may include real sequential vehicle operations associated with real commands, such as human sequential vehicle operations according to human commands.

Figure 4:
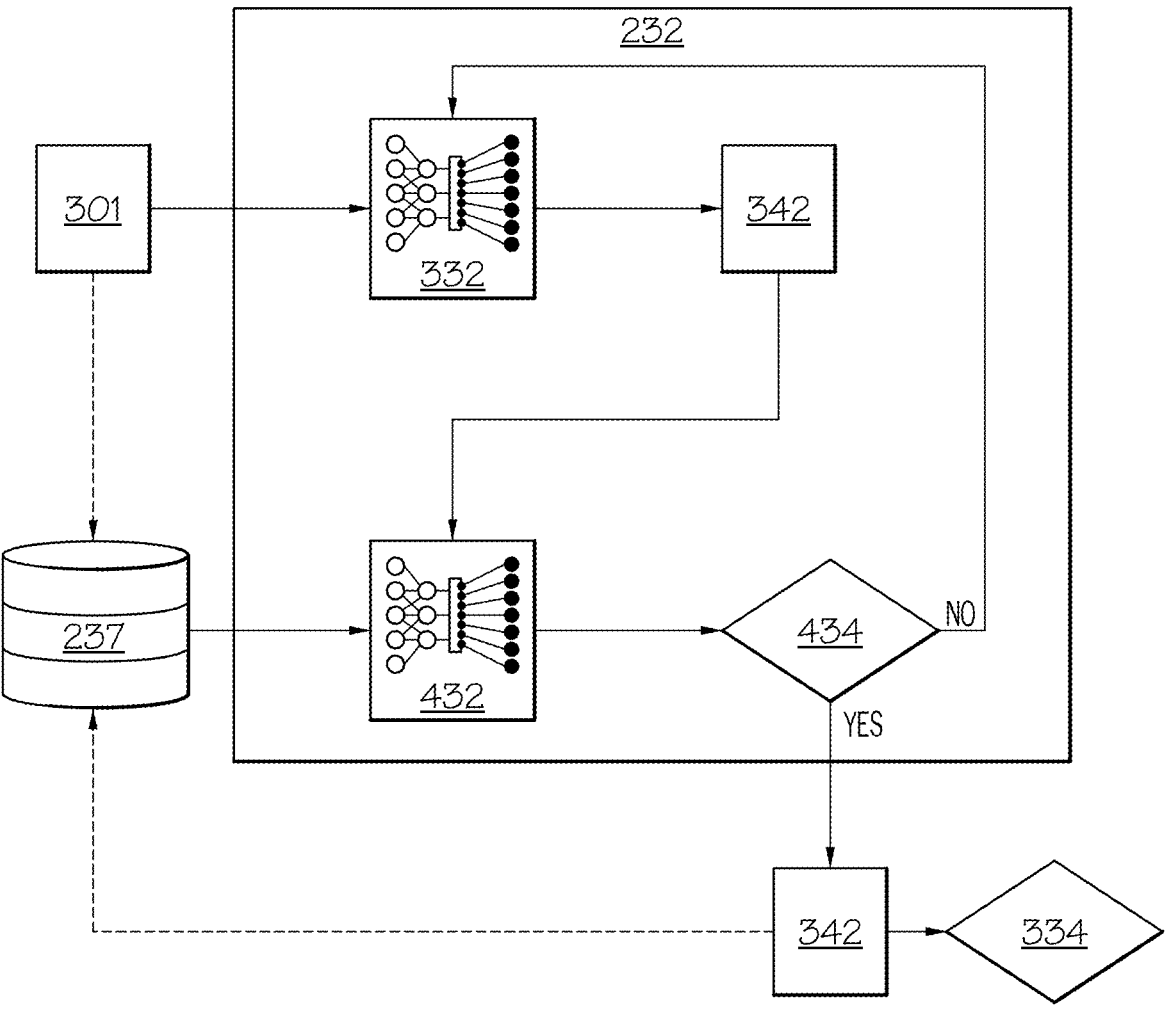
FIG. 4 schematically depicts an example block diagram of operating the example customizable command system using generative artificial intelligence (AI), according to one or more embodiments shown and described herein.

The memory component 202 may include one or more vehicle modules, such as the command interpreter module 232 and the aggressive operation module 242. The command interpreter module 232 and the aggressive operation module 242 may be trained and provide machine learning capabilities via a neural network as described herein. By way of example, and not as a limitation, the neural network may utilize one or more artificial neural networks (ANNs). ANNs may include node inputs, one or more hidden activation layers, and node outputs, and may be utilized with activation functions in the one or more hidden activation layers. ANNs are trained by applying such activation functions to training data sets to determine an optimized solution from adjustable weights and biases applied to nodes within the hidden activation layers to generate one or more outputs as the optimized solution with a minimized error. Further, each of the various modules may include a generative artificial intelligence (AI) algorithm. The generative AI algorithm may include a general adversarial network (GAN) that has two or more networks including one or more generator neural networks 332 and one or more discriminator neural networks 432 (e.g., as illustrated in FIG. 4). The generative AI algorithm may also be based on variation autoencoder (VAE) models or transformer-based models.

Still referring to FIG. 2, one or more environmental sensors 208 are coupled to the communication path 203 and communicatively coupled to the processor 204. While the particular embodiment depicted in FIG. 2 shows an icon with one environmental sensor 208 and reference is made herein to "environmental sensor" in the singular with respect to the vehicle 101, it is to be understood that this is merely a representation and embodiments of the system may include one or more environmental sensors 208 having one or more of the specific characteristics described herein.

The one or more environmental sensors 208 may include one or more cameras 110, such as the front camera, the side cameras, and the rear camera. The cameras 110 may be, without limitation, one or more of monocular cameras, RGB cameras, or RGB-D cameras. In some embodiments, the one or more environmental sensors 208 may be any device having an array of sensing devices capable of detecting radiation in an ultraviolet wavelength band, a visible light wavelength band, or an infrared wavelength band. The one or more environmental sensors 208 may have any resolution. In some embodiments, one or more optical components, such as a mirror, fish-eye lens, or any other type of lens may be optically coupled to the one or more environmental sensors 208. In embodiments described herein, the one or more environmental sensors 208 may provide image data to the one or more processors 204 or another component communicatively coupled to the communication path 203. The image data may include image data of the environment around the vehicle 101. In some embodiments, for example, in embodiments in which the vehicle 101 is autonomous or semi-autonomous, the one or more environmental sensors 208 may also provide navigation support. That is, data captured by the one or more environmental sensors 208 may be used by the sequential operation generator module 232 to generate sequential vehicle operations 342 to autonomously or semi-autonomously navigate the vehicle 101. The one or more environmental sensors 208 may operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors, and such data could be integrated into or supplement the data collection described herein to develop a fuller real-time traffic image.

The one or more environmental sensors 208 may further include one or more position sensors to collect the location data, such as global positing system (GPS) devices, one or more weather sensors to collect weather data, such as a thermometer, a barometer, a hygrometer, an anemometer, an ultrasonic sensor, a pyranometer, or the like. For example, heavy rainfall may be detected facilitated through rain sensors on the windshield or by monitoring the frequency and intensity of raindrops hitting the vehicle. Fog may be detected using a light sensor of low visibility.

In operation, the one or more environmental sensors 208 may collect location data, weather information data, and image data, and communicate the image data and environmental information data 327 to the one or more processors 204 and/or to other systems communicatively coupled to the communication path 203. The environmental information data 327 and image data may be received by the processor 204, which may process the environmental information data 327 and image data using one or more environmental data processing algorithms, such as image processing algorithms. The imaging processing algorithms may include, without limitation, an object recognition algorithm, such as a real-time object detection models, and depth algorithms. Any known or yet-to-be-developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movements from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded-up robust features ("SURF"), and edge-detection algorithms. The image processing algorithms may include machine learning functions and be trained with sample images including ground truth objects and depth information.

In embodiments, the vehicle 101 may include one or more other sensors 210, such as one or more motion sensors 136 for detecting and measuring motion and changes in motion of the vehicle 101. Each of the one or more motion sensors 136 is coupled to the communication path 203 and communicatively coupled to the one or more processors 204. The motion sensors 136 may include inertial measurement units. Each of the one or more motion sensors 136 may include one or more accelerometers and one or more gyroscopes. Each of the one or more motion sensors 136 transforms the sensed physical movement of the vehicle 101 into a signal indicative of an orientation, a rotation, a velocity, or an acceleration of the vehicle 101. The one or more motion sensors 136 may include, without limitation, one or more steering angle sensors, vehicle speed sensors, gyroscopes, inertial measurement units, or any other steering sensors operable to collect data on vehicle trajectory. For example, the steering angle sensor may measure the rotation of the steering wheels of the vehicle 101 and provide data on the angle at which the steering wheel is turned, indicating the intended direction of the vehicle. The vehicle speed sensors may monitor the speed of the vehicle wheels to provide real-time data on the vehicle's speed. The gyroscopes may detect the changes in orientation and angular velocity of the vehicle 101 by measuring the rate of rotation around different axes. In some embodiments, the one or more processors 204 may operably control the steering and break of the vehicle 101 based on the motion data generated by the motion sensors 136 to enable the vehicle 101 to perform various maneuvers, such as, without limitation, accelerating or decelerating to reach a desirable velocity, stopping at desirable position, and turning at desirable angle.

Referring to FIGS. 3 and 4, block diagrams of using the customizable command system 100 are depicted. The customizable command system 100 may receive user input 301 that includes one or more user commands and further generate the sequential vehicle operations 342 to operate the vehicle 101 according to the user commands.

Referring to FIG. 3, the user input 301, such as user voices, texts, and images, may be received through the one or more command sensors 215 and fed to the command interpreter module 232. The command interpreter module 232 may interpret the user input 301 and determine whether the user input 301 includes one or more functions of vehicle operation. The command interpreter module 232 may further determine whether the functions include at least a high-level function of vehicle operations. For example, the user may provide a voice command by saying "Pass the front car" or "Stop in front of the apartment entrance." The sound sensors 121 may receive and transfer the user voice into sound data as input data, and transfer the sound data to the command interpreter module 232. At block 312, the command interpreter module 232 may check the words and meanings in the user voice and determine whether the user input 301 includes one or more user commands, such as pass or stop, regarding vehicle operations, and in response to that the user input 301 includes one or more user commands, further determine whether the user commands includes one or more high-level functions of vehicle operation.

In embodiments, once the command interpreter module 232 detects that the user input 301 includes at least one user command including one or more high-level functions of vehicle operation, at block 313, the command interpreter module 232 may generate sequential vehicle operations 342 for the corresponding user commands based on sample sequential vehicle operations 237. The sample sequential vehicle operations 237 may include real sequential vehicle operations performed by humans according to real user commands and historical sequential vehicle operations. The generated sequential vehicle operations 342 may then be fed to the aggressive operation module 242, which, at block 334, determines whether the generated sequential vehicle operations 342 are aggressive operations considering the environmental information data 327 compared against the historical environmental information 247. In determining the generated sequential vehicle operations 342 are not aggressive operations, at block 307, the customizable command system 100 may operate the vehicle 101 using the sequential vehicle operations 342. Conversely, in determining the generated sequential vehicle operations 342 are aggressive operations, at block 309, the customizable command system 100 may warn the user regarding the aggressiveness of the user command included in the user input 301.

In some embodiments, the command interpreter module 232 may include one or more large language models (LLMs). The LLMs may include one or more deep learning algorithms that can detect the one or more user commands in the user input 301 and further determine whether the user commands include high-level functions of vehicle operations. In some embodiments, LLMs may identify the high-level function in the user command by using a natural language processing analysis. The command interpreter module 232 may preprocess the user input 301, such as removing stop words, punctuation, and other unnecessary characters, stemming, and lemmatization to reduce words to their root form. The command interpreter module 232 may then identify command keywords and phrases using different methods, such as bag-of-words, term frequency-inverse document frequency (TF-IDF), and n-grams. The bag-of-words method counts the number of times each word appears in the text to create a vector representation of the text. The TF-IDF method further weights the importance of each word in the text based on its frequency and how often it appears in similar texts of commands. The TF-IDF may create a desirable representation of the text. The n-grams method may consider groups of n-words together, such as bigrams (two words) or trigrams (three words) to identify common phrases and patterns in the text of the user narratives. The filtered command words and phrases may be clustered into general vehicle operation commands. The clustering step may be done in a machine learning algorithm, such as k-means clustering or latent Dirichlet allocation, as provided in the generator neural network 332 (as illustrated in FIG. 4) of the command interpreter module 232. For example, the generator neural network 332 may analyze word co-occurrence patterns to identify groups of words that frequently appear together and assign probabilities to each command for a given document.

In some embodiments, the natural language processing analysis may include calculating the term frequency of each word in the input text and calculating distances between the words. The command interpreter module 232 may calculate distances between words in the user input 301. The distances can be measured using various techniques such as Euclidean distance, cosine similarity, or other similarity measures. These distances capture the semantic or contextual relationships between words, indicating how closely related or similar they are within the text. Based on the calculated term frequencies and distances, the command interpreter module 232 may identify high-level function language within the user input 301. This may involve clustering similar words together or identifying words that frequently co-occur, suggesting they are related in meaning or context.

In some embodiments, the LLMs may determine whether the user command including one or more high-level function of vehicle operation existing in the user input 301 is beyond a preset confidence level. After detecting the user command in the user input 301, the command interpreter module 232 may determine a high-level function probability to each user command, indicating the likelihood of high-level function. The determination may be based on the user's background and function-labeled texts in association with the individuals, group, or others having similar backgrounds as the user, as included in the command database and user command profiles 227. In one embodiment, the command interpreter module 232 may calculate the high-level function probability based on the number of high-level function languages detected in the user input 301. For example, the system may use a formula of the probability of high-level function as $(1-(\text{number of high-level function languages}*(1-\text{confidence level})))$. In one instance, with a preset confidential level of 90%, the command interpreter module 232 may detect 5 different high-level function languages existing in the text. Accordingly, the probability of a high-level function is equal to $(1-5\times0.1)=95\%$. In other embodiments, the customizable command system 100 may consider several factors in gauging the high-level function probability, such as the degree of high-level function for different words and phrases, the length of the high-level function language, and the percentage of the high-level language in the text, and other similar factors.

In some embodiments, the LLMs may be trained using the command database and user command profile 227 to understand the user input 301. The command database may include example labeled phrases or sentences that users may use to convey verbal or textual commands to trigger functions of the vehicle operations. For example, the command database may include a command of "start the engine" representing the function of starting engine of the vehicle 101, and multiple sample languages associated with the command, such as "turn on the car," "start the motor," and "engage ignition." The user command profile 227 may include personalized datasets that capture the language preferences and variations of individual users concerning high-level vehicle functions. Each user command profile may include a user identifier, language preferences for issuing commands, command usage history, vocabulary, and syntax. The LLMs may be further fine-tuned in the form of self-supervised learning, such as data labeling to assist the LLMs to improve identification of different user commands. The LLMs may undertake deep learning through the transformer neural network process.

In some embodiments, the customizable command system 100 may recognize various high-level functions of vehicle operation, such as, without limitation, overtake, pass, merge, park, stop, navigate to a destination, emergency stop, or other maneuvering actions, in the user input 301. For example, the command interpreter module 232 may determine whether the user input 301 contains a user command of overtaking or passing by determining whether the user input 301 includes words or meaning of an act of passing another vehicle traveling in the same direction by moving into an adjacent lane or passing zone. The command interpreter module 232 may determine whether the user input 301 contains the user command of merging by determining whether the user input 301 includes words or meanings of combining or joining into traffic from a separate lane or entrance ramp, which may require coordination with other vehicles to safely integrate into the flow of traffic. The command interpreter module 232 may determine whether the user input 301 contains the user command of parking by determining whether the user input 301 includes words or meanings of bringing the vehicle 101 to a stop and securing the vehicle 101 in a designated parking spot, whether parallel, perpendicular, or angled parking. The command interpreter module 232 may determine whether the user input 301 contains the user command of stopping or emergency stop by determining whether the user input 301 includes words or meanings of halting the vehicle's movement completely, typically at a designated stopping point or in response to a sudden and unexpected hazard or danger, such as an obstacle in the road or a pedestrian crossing unexpectedly. The command interpreter module 232 may determine whether the user input 301 contains the user command of accelerating or decelerating by determining whether the user input 301 includes words or meanings of increasing the vehicle's speed from a stopped or slow-moving position to reaching a desired speed or reducing the vehicle's speed. The command interpreter module 232 may determine whether the user input 301 contains the user command of turning by determining whether the user input 301 includes words or meanings of changing the vehicle's direction by steering left or right, whether to follow the curvature of the road, make a maneuver at an intersection, or navigate through a curve or bend.

In embodiments, the command interpreter module 232, in response to determining that the user input 301, such as user voices, texts, and images, includes at least one high-level function, the command interpreter module 232 may generate the sequential vehicle operations 342 including one or more fundamental functions, such as, without limitation, acceleration, deceleration, braking, traffic monitoring, steering input, gear selection, lighting control, climate control, and a combination thereof.

For example, for the high-level function of overtaking, the command interpreter module 232 may interpret the user input 301 into one or more fundamental functions in the sequential vehicle operations 342, such as checking blind spots for approaching vehicles, accelerating to surpass the slower vehicle, maintaining a safe distance from other vehicles while overtaking, signaling an intention to overtake, and returning to original lane after completing the maneuver. For the high-level function of passing, the command interpreter module 232 may interpret the user input 301 into one or more fundamental functions in the sequential vehicle operations 342, such as checking traffic conditions and ensuring a detected safety level is above a desirable safety level, accelerating to overtake the vehicle in front, checking blind spots before changing lanes, signaling intention to pass, and returning to original lane after passing. For the high-level function of merging, the command interpreter module 232 may interpret the user input 301 into one or more fundamental functions in the sequential vehicle operations 342, such as checking traffic in the merging lane, signaling intention to merge, adjusting speed to merge into traffic in a manner above a desirable safety level, checking blind spots before merging, and coordinating with surrounding vehicles to ensure smooth merging. For the high-level function of parking, the command interpreter module 232 may interpret the user input 301 into one or more fundamental functions in the sequential vehicle operations 342, such as identifying parking space in line with the user input 301, signaling intention to park, approach the parking space at a desirable speed, maneuvering the vehicle into the parking space, adjusting position as necessary, and engaging parking brake and shift to park. For the high-level function of stopping, the command interpreter module 232 may interpret the user input 301 into one or more fundamental functions in the sequential vehicle operations 342, such as identifying the need to stop (e.g., traffic light, stop sign), checking mirrors and blind spots for surrounding vehicles, desirably reducing speed (e.g., gradually reducing), coming to a complete stop at the designated location, and engaging parking brake if necessary. In some embodiments, the command interpreter module 232 may further determine whether the user input 301 is about an emergency stop and may generate sequential vehicle operations 342, such as identifying the emergency requiring a stop (e.g., obstacle in the road, sudden hazard), checking mirrors and blind spots for surrounding vehicles, braking firmly to bring the vehicle to a rapid stop, activating hazard lights to warn other drivers, assessing the situation and take appropriate action (e.g., call for assistance, check for injuries). For the high-level function of navigating to a desirable destination, the command interpreter module 232 may interpret the user input 301 into one or more fundamental functions in the sequential vehicle operations 342, such as checking destination address or coordinates, calculating optimal or desirable route based on current location, traffic conditions, and user preferences associated with the user providing the user input 301, providing turn-by-turn navigation instructions, continuously monitoring route and provide real-time updates if necessary, and alerting the driver of upcoming maneuvers and lane changes.

Still referring to FIG. 3, in some embodiments, the generated sequential vehicle operations 342 may be fed into the aggressive operation module 242 to determine, at block 334, whether the generated sequential vehicle operations 342 are aggressive. The aggressive operation module 242 may evaluate the generated sequential vehicle operations 342 against the environmental information to determine the reasonableness of the sequential vehicle operations 342. In some embodiments, the aggressive operation module 242 may evaluate the sequential vehicle operations against the environmental information to generate an aggressive operation value and further compare the generated aggressive operation value against an aggressive operation threshold. At block 309, in response to determining that the aggressive operation value is beyond the aggressive operation threshold, the aggressive operation module 242 may transmit a warning to the user regarding the unreasonableness of the user command included in the user input 301. Conversely, at block 307, in response to determining that the aggressive operation value is less than or equal to the aggressive operation threshold, the customizable command system 100 may operate the vehicle 101 using the generated sequential vehicle operations 342. In embodiments, the aggressive operation value may be calculated based on various factors, such as, without limitation, road type, traffic conditions, and environmental factors like weather and road condition of the sequential vehicle operations 342. The aggressive operation threshold may be determined based on the speed, acceleration, declaration, turning forces, and following distance, considering environmental factors, such as weather and road conditions. The threshold may be determined aiming to balance between safety and efficiency considerations and user preference, which may be adjusted over time based on real-world feedback and performance evaluations.

In some embodiments, after the aggressive operation module 242 determines the reasonableness of the generated sequential vehicle operations 342, the customizable command system 100 may update the command database and user command profile 227, sample sequential vehicle operations 237, and historical environmental information 247 with the user input 301, the generated sequential vehicle operations 342, and the environmental information data 327. The Referring now to FIG. 4, the block diagram depicts an example command interpreter module 232 including two neural networks 332 and 432 to generate the sequential vehicle operations 342. In some embodiments, the command interpreter module 232 may include a generative AI model, such as a general adversarial network (GAN). In these embodiments, the command interpreter module 232 may include a generator neural network 332 and a discriminator neural network 432. The discriminator neural network 432 and the generator neural network 332 work in the constant connection between them. The generator neural network 332 may include one or more models to generate the sequential vehicle operations 342 based on the user input 301, such as user voices, texts, and images. The discriminator neural network 432 may determine, at block 434, whether the generated sequential vehicle operations 342 is not distinguishable from the real sequential vehicle operations as included in the sample sequential vehicle operations 237. If the answer is a "yes," the command interpreter module 232 may output the generated sequential vehicle operations 342 for further operations, such as to determine whether the generated sequential vehicle operations 342 are aggressive at block 334. If the answer to block 434 is a "no," the generator neural network 332 may regenerate different sequential vehicle operations for the discriminator neural network 432 to evaluate. That is, while the generator neural network 332 creates "fake" sequential vehicle operations including the fundamental functions of the vehicles 101 or a combination of the fundamental functions in fulfilling a user command, the discriminator neural network 432 may attempt to distinguish the creates "fake" sequential vehicle operations from the genuine cases in the sample sequential vehicle operations 237 (real examples). The two neural networks 332 and 432 may be trained together, with the discriminator neural network 432 seeking to detect generated instances with improved correctness and the generator neural network 332 attempting to generate samples that the discriminator neural network 432 cannot distinguish as distinct from real examples.

In embodiments, the generator neural network 332 and the discriminator neural network 432 may include embedding layers including CNNs and/or RNNs to generate a desired output of generated sequential vehicle operations 342 that has none or minor differences from the real output, such as the real sequential vehicle operations included in the sample sequential vehicle operations 237. The discriminator neural network 432 may further include an output layer with output activation energy, whose value is between 0 and 1, indicating the similarity to the real output. The customizable command system 100 may further include a latent space. The latent space may mix with noise to feed the generator neural network 332 to generate fake examples.

In some embodiments, the customizable command system 100 may be pre-trained. For pre-training, the customizable command system 100 includes a pre-training dataset of output, such as a strategy of functions in fulfilling a sample commands from one or more humans. The sample commands included in the sample sequential vehicle operations 237 may directly resemble a fundamental function, such as accelerate, decelerate/brake, steer/turn, change gears, and adjust climate control. The example commands may be high-level commands that require more than one fundamental function, such as overtake, pass, merge, park, stop, navigate to a destination, or emergency stop. The customizable command system 100 may prepare the pre-training dataset of fake output, pairing it with the random input/random noises, along with the real examples that include the real human input and outputs included in the sample sequential vehicle operations 237. The fake input and output served as the pre-training data for the generator neural network 332 and the real input and output served as the pre-training data for the discriminator neural network 432. The pre-training dataset may cover a wide range of human commands that are personalized to fulfill specific goals and involve various steps using different types of functions.

During training, the training process may involve an adversarial game between the generator neural network 332 and the discriminator neural network 432. The generator neural network 332 may aim to produce outputs of generated sequential vehicle operations 342 that fool the discriminator neural network 432, while the discriminator neural network 432 may try to correctly distinguish between real and generated outputs. The training process may involve using an encoder-decoder architecture or reinforcement learning techniques to improve the models' performance. The steps involved in the training process may include feeding the generator neural network 332 to obtain a generated output, feeding the generated output and the corresponding real output (if available) to the discriminator neural network 432, which evaluates and provides a probability score for each input, computing the loss (using a loss function) for both the generator neural network 332 and the discriminator neural network 432 based on the discriminator's evaluations, with the aims for the generator neural network 332 to minimize the discriminator's probability score for generated outputs, and for the discriminator neural network 432 to maximize the discriminator's probability score. The process may further include performing backpropagation through the generator neural network 332 and the discriminator neural network 432 to update their respective weights and minimize their losses, using techniques such as stochastic gradient descent (SGD) or variants like Adam for optimization. Such a pre-training process may be repeated by generating new outputs, evaluating them with the discriminator neural network 432, and updating the models until the desired performance or convergence is achieved.

Figure 5:
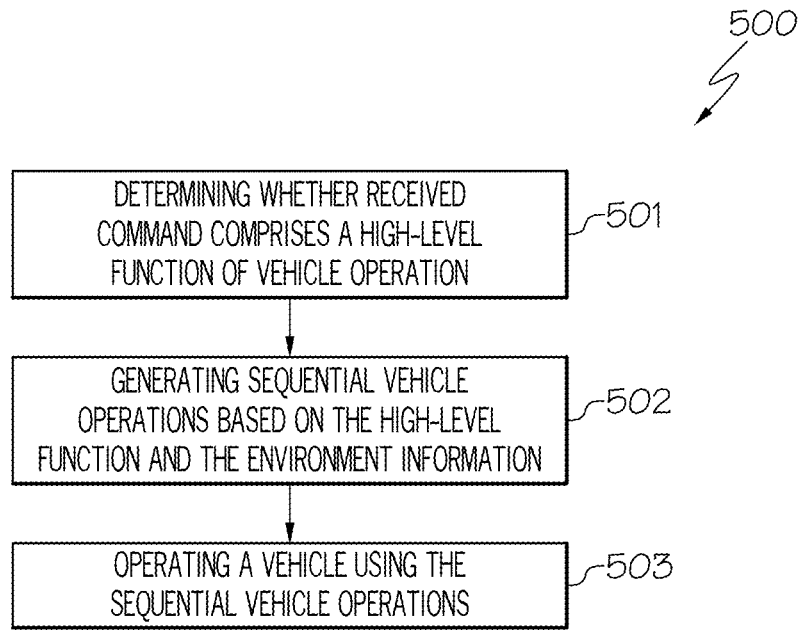
FIG. 5 illustrates a flow diagram of illustrative steps for vehicle control with customizable commands, according to one or more embodiments shown and described herein.

In some embodiments, after the command interpreter module 232 generates the sequential vehicle operations 342 based on the user input 301, the customizable command system 100 may create a mapping between the personalized commands included in the user input 301 and the functions, preferences, and settings associated with the sequential vehicle operations 342 to store in the sample sequential vehicle operations 237 for future sequential vehicle operation generation. The customizable command system 100 may ask for feedback from the user for fine-tuning the personalized commands. The customizable command system 100 may further include safety and security measures to prevent unauthorized access and misuse of vehicle functions Referring to FIG. 5, an example flow diagram of illustrative steps for customizable commands of vehicle operation is illustrated. At block 501, the method 500 for customizable commands of vehicle operation includes determining, based on the command database and user command profiles 227, whether a received command includes a high-level function of vehicle operation. At block 502, the method 500 for customizable commands of vehicle operation includes in response to determining that the received command includes the high-level function, generating sequential vehicle operations 342 based on the high-level function and environmental information generated by one or more environmental sensors 208. The sequential vehicle operations 342 includes one or more fundamental functions of vehicle operation. At block 503, the method 500 for customizable commands of vehicle operation includes operating the vehicle 101 using the sequential vehicle operations 342.

In some embodiments, the method 500 may further include generating an aggressive operation value by evaluating the sequential vehicle operations 342 against the environmental information 327, determining whether the aggressive operation value is beyond an aggressive operation threshold, and in response to determining that the aggressive operation value is beyond the aggressive operation threshold, transmitting a warning to the user.

In some embodiments, the method 500 may further include determining, using a LLM, whether the received command comprises a high-level function, generating, using one or more neural network models, the sequential vehicle operations 342. The one or more neural network models may include a generative AI model. The generative AI model may include a general adversarial network.

In some embodiments, the command may include, without limitation, a voice command, a text command, an image command, or a combination thereof. The one or more fundamental functions may include, without limitation, acceleration, deceleration, braking, traffic monitoring, steering input, gear selection, lighting control, and climate control. The environmental information may include, without limitation, weather conditions, wind direction and speed, road conditions, traffic conditions, and obstacle information. The high-level function may be, without limitation, overtake, pass, merge, park, stop, navigate to destination, or emergency stop.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including matters of logic with respect to the arrangement of steps, operational flow, order of components, or orientation of components; plain meaning derived from grammatical organization or punctuation, and; the number or type of embodiments described in the specification.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

It is to be understood that the embodiments are not limited in their application to the details of construction and the arrangement of components set forth in the description or illustrated in the drawings. The invention is capable of some embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

What is claimed is:

1. A system for customizable commands for vehicle operation comprising:
   one or more command sensors configured to receive a command from a user;
   one or more environmental sensors configured to collect environment information;
   one or more processors configured to cause the system to:

determine, based on a command database and user command profiles, whether the received command comprises a high-level function of vehicle operation;
   in response to determining that the received command comprises the high-level function, generate sequential vehicle operations based on the high-level function and the environment information, the sequential vehicle operations comprising one or more fundamental functions of vehicle operation;
   generate an aggressive operation value by evaluating the sequential vehicle operations against the environment information;
   determine whether the aggressive operation value is beyond an aggressive operation threshold, wherein the aggressive operation threshold is determined based on road type, road condition, weather, and traffic conditions;
   in response to determining that the aggressive operation value is beyond the aggressive operation threshold, transmit a warning to the user; and
   in response to determining that the aggressive operation value is less than or equal to the aggressive operation threshold, operate a vehicle using the sequential vehicle operations.

2. The system of claim 1, wherein the one or more processors configured to cause the system to determine, using a language understanding model (LLM), whether the received command comprises a high-level function.

3. The system of claim 1, wherein the one or more processors configured to cause the system to generate, using one or more neural network models, the sequential vehicle operations.

4. The system of claim 3, wherein the one or more neural network models comprise a generative artificial intelligent (AI) model.

5. The system of claim 4, wherein the generative AI model comprises a general adversarial network.

6. The system of claim 1, wherein the command comprises a voice command, a text command, an image command, or a combination thereof.

7. The system of claim 1, wherein the one or more fundamental functions comprise acceleration, deceleration, braking, traffic monitoring, steering input, gear selection, lighting control, and climate control.

8. The system of claim 1, wherein the environment information comprises weather conditions, wind direction and speed, road conditions, traffic conditions, obstacle information, or combinations thereof.

9. The system of claim 1, wherein the high-level function is overtake, pass, merge, park, stop, navigate to destination, or emergency stop.

10. A method for customizable commands of vehicle operation comprising:
   determining, based on a command database and user command profiles, whether received command comprises a high-level function of vehicle operation;
   in response to determining that the received command comprises the high-level function, generating sequential vehicle operations based on the high-level function and environment information generated by one or more environmental sensors, the sequential vehicle operations comprising one or more fundamental functions of vehicle operation;
   generating an aggressive operation value by evaluating the sequential vehicle operations against the environment information;

determining whether the aggressive operation value is beyond an aggressive operation threshold, wherein the aggressive operation threshold is determined based on road type, road condition, weather, and traffic conditions;

in response to determining that the aggressive operation value is beyond the aggressive operation threshold, transmitting a warning to the user; and in response to determining that the aggressive operation value is less than or equal to the aggressive operation threshold, operating a vehicle using the sequential vehicle operations.

11. The method of claim 10, wherein the method further comprises determining, using a language understanding model (LLM), whether the received command comprises a high-level function.

12. The method of claim 10, wherein the method further comprises generating, using one or more neural network models, the sequential vehicle operations.

13. The method of claim 12, wherein the one or more neural network models comprise a generative artificial intelligent (AI) model.

14. The method of claim 13, wherein the generative AI model comprises a general adversarial network.

15. The method of claim 10, wherein the command comprises a voice command, a text command, an image command, or a combination thereof.

16. The method of claim 10, wherein the one or more fundamental functions comprise acceleration, deceleration, braking, traffic monitoring, steering input, gear selection, lighting control, and climate control.

17. The method of claim 10, wherein the environment information comprises weather conditions, wind direction and speed, road conditions, traffic conditions, obstacle information, or combinations thereof.

18. The method of claim 10, wherein the high-level function is overtake, pass, merge, park, stop, navigate to destination, or emergency stop.

* * * * *